(12) United States Patent
Watts, Jr. et al.

(10) Patent No.: US 7,111,321 B1
(45) Date of Patent: Sep. 19, 2006

(54) PORTABLE COMPUTER SYSTEM WITH HIERARCHICAL AND TOKEN-BASED SECURITY POLICIES

(75) Inventors: La Vaughn F. Watts, Jr., Temple, TX (US); James E. Dailey, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 09/237,016

(22) Filed: Jan. 25, 1999

(51) Int. Cl.
*G06F 7/04* (2006.01)
*G06F 17/00* (2006.01)
*G06F 1/26* (2006.01)
*G06F 15/173* (2006.01)
*G06F 15/16* (2006.01)

(52) U.S. Cl. .............. 726/2; 726/1; 726/3; 726/4; 726/9; 726/27; 726/34; 709/223; 709/224; 709/225; 709/226; 709/227; 709/228; 709/229; 705/50; 705/55

(58) Field of Classification Search .............. 713/1, 713/2, 100, 182, 184–185, 166, 172, 159, 713/200–202; 709/223–229; 726/1, 2, 3, 726/4, 9, 27, 34; 705/50, 55
See application file for complete search history.

(56) References Cited

U.S. PATENT DOCUMENTS

| 5,323,465 | A | * | 6/1994 | Avarne ..................... 713/185 |
| 5,402,492 | A | | 3/1995 | Goodman et al. ............ 380/25 |
| 5,606,615 | A | | 2/1997 | Lapointe et al. ............. 380/25 |
| 5,630,057 | A | | 5/1997 | Hait ............................ 395/186 |
| 5,664,950 | A | | 9/1997 | Lawrence ................... 439/76.1 |
| 5,691,928 | A | | 11/1997 | Okaya et al. .......... 364/709.05 |
| 5,778,071 | A | | 7/1998 | Caputo et al. ................ 380/25 |
| 5,805,880 | A | | 9/1998 | Pearce et al. ................ 395/652 |
| 5,949,882 | A | * | 9/1999 | Angelo |
| 6,282,649 | B1 | * | 8/2001 | Lambert et al. |
| 6,421,782 | B1 | * | 7/2002 | Yanagisawa et al. ........... 726/4 |

OTHER PUBLICATIONS

The Authoritative Dictionary Seventh Edition, IEEE, p. 1015.*
John G. Spooner, "*Dell to Safeguard PCs*", Oct. 12, 1998, *PC Week*, p. 14.
John G. Spooner, "*Smart Card Guards Notebooks*", Oct. 28, 1998, *PC Week*, p. 49.

* cited by examiner

*Primary Examiner*—Christopher Revak
*Assistant Examiner*—Jenise Jackson
(74) *Attorney, Agent, or Firm*—Baker Botts L.L.P.

(57) ABSTRACT

A computer system including a processor, an access token communicator capable of being coupled to the processor and adapted to read an access token, an input device coupled to the processor that is able to receive verification data that confirms authorized access of the access token, and software executable on the processor that includes instructions to control access to the processor and including code to access the access token and the verification data, code to verify the validity of the access token using the verification data, code to set security policies in the processor, and code to control access to resources in the processor based on the security policies. In addition, a method for reading an access token, verifying the validity of the access token, setting security policies in a computer system, and unlocking a computer system and a nonvolatile storage device attached to the computer system.

36 Claims, 8 Drawing Sheets

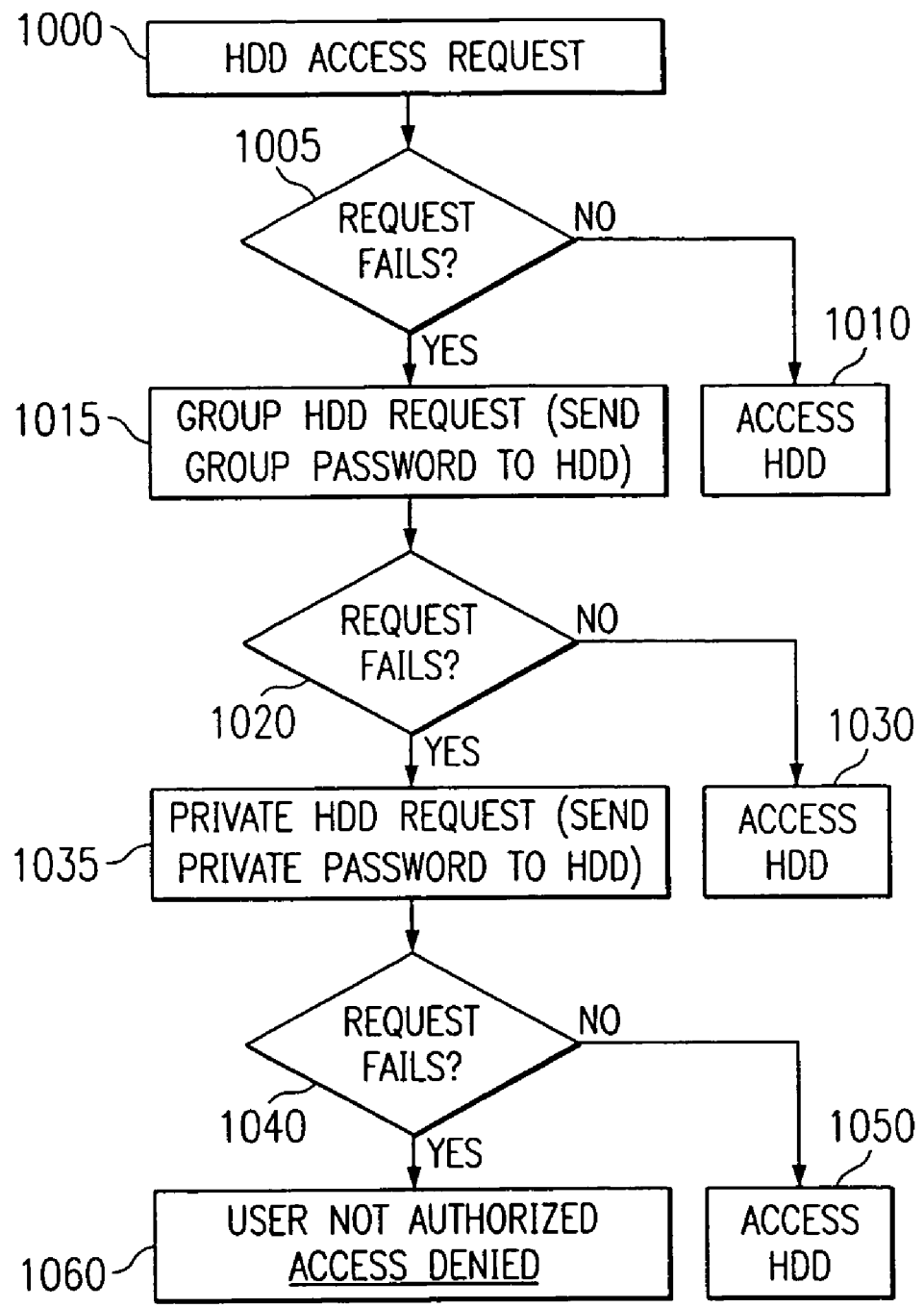

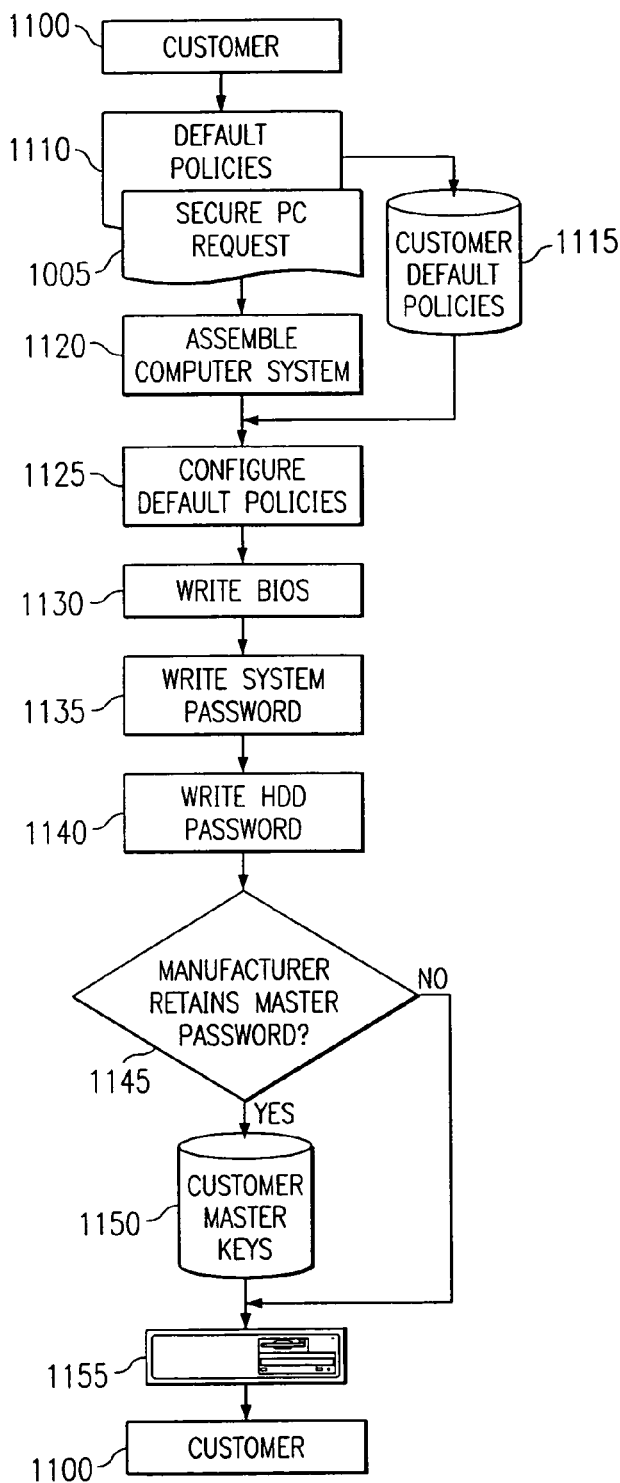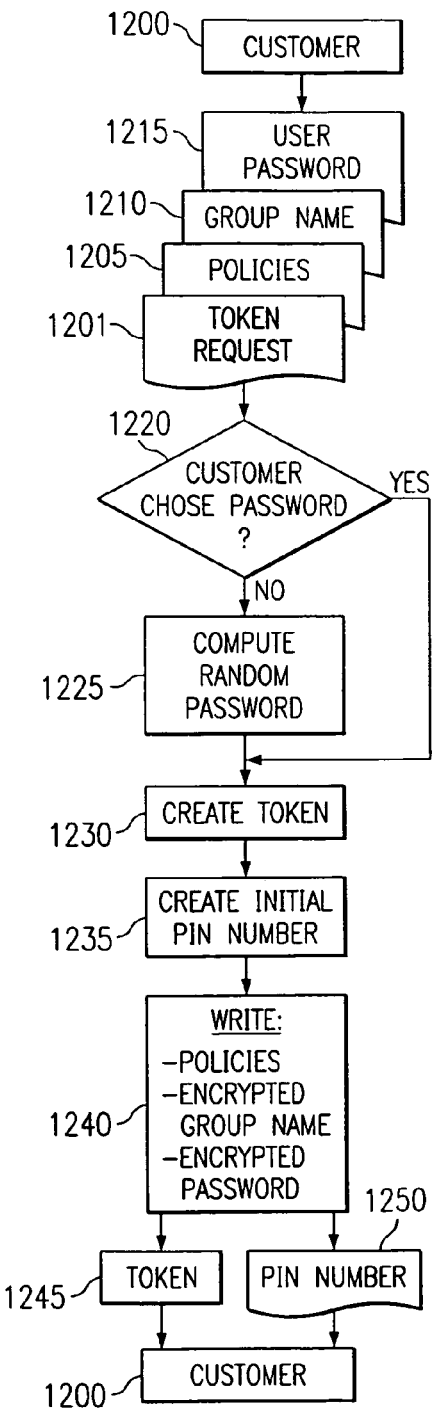

PORTABLE COMPUTER SYSTEM WITH HIERARCHICAL AND TOKEN-BASED SECURITY POLICIES

BACKGROUND

1. Field

This field relates to securing a computer system and the data contained within a computer system.

2. Description of the Related Art

Computer systems in general and International Business Machines (IBM) compatible personal computer systems in particular have attained widespread use for providing computing power to many segments of today's modern society. A personal computer system can usually be defined as a desk top, floor standing, or portable microcomputer that includes a system unit having a system processor and associated volatile and non-volatile memory, a display monitor, a keyboard, one or more diskette drives, a fixed disk storage device and an optional printer. These personal computer systems are information handling systems which are designed primarily to give independent computing power to a single user (or a relatively small group of users in the case of personal computers which serve as computer server systems) and are inexpensively priced for purchase by individuals or small businesses. A personal computer system may also include one or a plurality of I/O devices (i.e. peripheral devices) which are coupled to the system processor and which perform specialized functions. Examples of I/O devices include modems, sound and video devices or specialized communication devices. Non-volatile storage devices such as hard disks, CD-ROM drives and magneto-optical drives provide mass storage of data for the computer system.

Computer systems pose several security challenges to organizations that may need to store sensitive enterprise information. Employees often travel with personal laptop, or notebook, computers that store sensitive information about the organization. This sensitive information can range from strategic marketing plans to detailed proprietary designs. Employees often perform work away from the organization's physical location and may work from a home office, an airplane, or an automobile. This is especially true of marketing representatives who are away from the organization. The computer systems these employees use are at greater risk when the employee is away from the physical security provided by the organization. For example, someone could break into the employee's home and steal or use the employee's computer system. This computer system may also allow the user to dial into the company's main computer system, such as a mainframe or server, putting the data on the main computer at risk as well.

Current methods of protecting computer systems and the data that is stored on such systems pose challenges for organizations. A password may be used to prevent someone from accessing the computer system. This password is usually entered from a keyboard by a user in response to a logon screen that appears when the computer is turned on or rebooted. In some systems the password is maintained by the system's "Basic Input-Output System," or "BIOS." The BIOS information, including the password, is often not stored on the system's hard drive, rather it is often stored on a nonvolatile memory area so that the information is not lost if the hard drive fails or is replaced. In some systems, the BIOS is maintained by a separate battery that supplies a small amount of power to the memory so that the memory is retained. In these systems, it may be possible to erase the password by simply removing the battery from the system for a certain amount of time. In systems where the BIOS password is not susceptible to being erased by removing the system battery, a challenge still exists in that the password is limited to a few keystrokes.

The user of the computer system, who typically is the person to change the password, often keeps the password relatively simple in terms of both length and format. Passwords are commonly names of family members or other common words that the user will easily remember and are easily entered from the keyboard. This password security can be breached if the thief watches the user enter the password or has ample time to determine the password. An additional challenge of password protection is the fact that, once away from the physical organization, the organization has little or no means of ensuring that the employees follow security policies (i.e., the frequency of changing passwords, length and format of passwords, etc.) or even ensuring that the employee does not disable the password protection.

It is often the information stored on the nonvolatile storage, i.e., hard drive, of the computer system that is critical or valuable to the organization, and not the physical computer itself. If a thief has targeted a particular computer system because of the data that is stored on the system rather than the value of the computer system itself, the thief may remove and steal the hard drive from the computer system rather than the entire system. Hard drives on many systems, especially notebook computers, are designed to be removable so that a different hard drive can be used with the computer system. These hard drives are often quite small and could be hidden in a pocket. Once the hard drive has been stolen, the drive can be inserted into a separate system that can be used by the thief to read the data.

Some hard drives, for example those using the ATA-3 architecture, store an additional password with the hard drive itself. If a password is set for the hard drive, then the hard drive must be supplied with a matching hard drive password before the drive is accessible. If a hard drive that has its password set is stolen, the thief cannot access the data unless they supply the correct password. The challenges inherent with a hard drive password are consistent with and similar to the challenges posed by password use in general. In addition, once the hard drive is attached to a system, a program could be written that repetitively supplies password entries until the correct password is found.

Various solutions have been employed to prevent the theft or unauthorized access of computer systems that are off-site (i.e., away from the organization's physical security). Alarms that sense the movement of a system act as a deterrent in alerting people that the system is being moved. Challenges associated with alarms in protecting data include the user having to remember to activate the alarm when the system is stationary and deactivate the alarm when the system is being moved. As notebook and other portable computers are often being moved more than they are stationary, using alarms with these types of computers is more challenging than using alarms on stationary systems, such as desktop computers.

Another category of devices that can be used to protect personal computers include devices used to lock the system to prevent unauthorized access to or removal of the equipment. Many of these devices use either adhesive-mounted pads or metal brackets to fasten the computer to a desk or tabletop. These devices are usually manufactured out of hardened steel. Some of these devices use special adhesives and others use bolts. Cables are a common security device and are somewhat more flexible than adhesive systems.

Usually, steel cables are passed through metal rings that are attached to the computer system and a desk or table. Although cables prevent someone from quickly taking a computer system, they can be cut with cable cutters and pose a challenge to mobile computer users, especially those who use notebook computers, and need to use their computer system in a plane or automobile.

Other anti-theft devices are card access control products. These products employ magnetic stripe cards, smart cards and key disks to control access to computers. These products allow the organization to control access to individual computers by requiring authorized users to use an access card or KeyDisk (a diskette which acts as a key) to unlock the computer. A challenge of using card access control products is that these devices can be stolen along with the computer. Because the computer does not know the identity of the person using the card access control product, the computer allows access to anyone who has possession of the product. Another challenge of these products is that they give the same access capabilities to any one in control of the particular card access control product. For example, a system administrator may use a card access control product to perform system functions, such as change the computer system password, whereas a common user only needs to use the application programs and view data stored on the computer system. However, if both the system administrator and common user use the same card access control product, both will be able to change the system password, even if the organizational policy dictates that only system administrators should change the password.

Another theft prevention device employed to prevent access to a computer system is a biometric control device which reads biometric data, such as a fingerprint, and only allows access to users whose biometric data has been stored in the computer system. This system presents a challenge in recording biometric data for all authorized users for every computer system. In the case of a large organization with selected system administrators responsible for maintaining a large quantity of systems, keeping track and updating the authorized users is a challenging task. In addition, the biometric data permanently stays with users who were authorized at one time even after they have left the organization or are otherwise no longer authorized to access the computer system. Without regularly updating the biometric parameters for all systems, it is a challenge of biometric systems of keeping former authorized users from accessing the computer systems and the data therein. Another challenge is that biometric software is often complex and is stored on the hard drive of the computer that is intended to be protected. In this respect, the hard disk containing the sensitive data is accessible before the biometric input is received. While very sensitive data may be encrypted so that only users with authorized biometric data are allowed to read the data, anyone can access the hard drive. A further challenge of biometric systems is that data may be lost if the authorized person dies or leaves the organization. Unless multiple sets of authorized biometric data have been stored for all data employing biometric protection, once the authorized individual is no longer available then no one can access the data.

Accordingly, what is needed in the art is a way of preventing access to a computer system and the data contained therein regardless of the location of the computer and with limited exposure of theft or data inaccessibility due to the theft of an access card or unavailability of a particular authorized user, and ensuring that security policies are enforced for a computer system even if the computer system is removed from the physical organization.

SUMMARY

To address the above-discussed deficiencies of the prior art in one aspect of the present invention, a system uses an access token to access the system and data located on a nonvolatile storage device. The system defines and implements security policies to ensure that established security standards are followed by the user of the system. An access code reduces the possibility that an unauthorized person can use the access token to access the system and the data contained on a nonvolatile storage device. The access token includes a computer system password to unlock the computer system and a nonvolatile storage device password to unlock the storage device. The access token further provides a technique by which a system receives security policies that are followed during operation of the computer system.

Accordingly, a security system introduces security policies to a system such as a computer system. The security policies are established for the system and imposed regardless of the physical location of the computer system. The security policies guard access to the system and the data contained on the nonvolatile storage device by including an access token containing passwords and security policies that cannot be altered by the user. The security policies further guard the system and shield the access token data from unauthorized people by only transmitting the passwords and security policies in response to the access token receiving input matching a secret access code included within the access token.

In one embodiment, the access token is a smart card containing an access code that is a personal identification, or "PIN," number used to verify the authority of the access token user. In response to the access token receiving the corresponding access code, the access token transmits access token data. Access token data includes policy information used by the computer system to force a user's compliance with security guidelines. Passwords, including the computer system password and the nonvolatile storage device password, are integrated with the policy bits contained in the access token so that modification of the policy bits renders the passwords inoperative.

The foregoing has outlined features and technical advantages of the described system so that those skilled in the art may better understand the detailed description of the invention that follows. Additional features and advantages of the system are described hereinafter that form a specific implementation relating to the appended claims. Those skilled in the art should appreciate that they can readily use the disclosed conception and specific embodiment as a basis for designing or modifying other structures for carrying out the described features. Those skilled in the art should also realize that such equivalent constructions do not depart from the spirit and scope of the invention in its broadest form.

BRIEF DESCRIPTION OF THE DRAWINGS

The present invention may be better understood, and its numerous objects, features, and advantages made apparent to those skilled in the art by referencing the accompanying drawings.

FIG. 10 is a flow diagram showing a sequence of steps used to access a protected nonvolatile storage device;

FIG. 11 is a flow diagram showing a manufacturing process for manufacturing a computer system including security policies; and FIG. 12 is a flow diagram showing a manufacturing process for manufacturing an access token.

The use of the same reference symbols in different drawings indicates similar or identical items.

DESCRIPTION OF THE PREFERRED EMBODIMENT(S)

Figure 1:
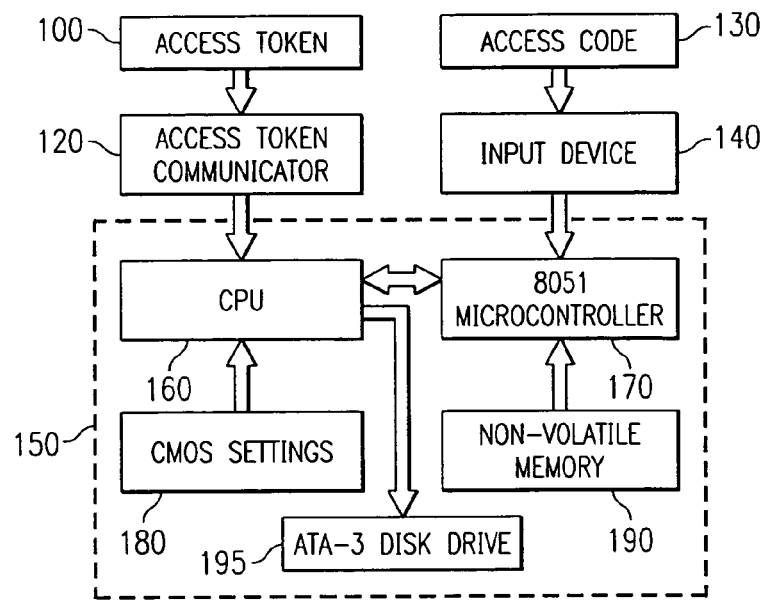
FIG. 1 is a block diagram of a computer system using an access token and an access code.

Referring initially to FIG. 1, illustrated is a block diagram of a computer system 150 employing an access token 100. The computer system 150 is illustrated as having a central processing unit (or "CPU") 160, a nonvolatile storage device 195 such as an ATA-3 type hard disk drive (or "HDD"), and an 8051 micro-controller 170. CPU 160 is shown receiving CMOS settings 180 from an area of nonvolatile memory, while the 8051 micro-controller 170 is shown receiving data from nonvolatile memory 190. Access token reader 120 is shown reading access token 100 and providing data to CPU 160 while password or access code 130 is shown entered into input device 140 and transmitted to micro-controller 170. Micro-controller 170 determines if access code 130 is correct and returns a "true" or "false" to CPU 160.

In one implementation, access token 100 is a smart card with circuitry preventing the alteration of the access token data that is read by the access token communicator 120. On a notebook computer system, the access token communicator 120 is variously adapted to communicate with an access token depending on the type of access token 100 used. For example, access token communicator 120 may be a separate device attached to computer system 150 using cables, may be integrated with the computer system through a touch-pad pointing device, integrated within the body of the computer system, or the like. In one embodiment, access token 100 is a smart card that includes a personal identification number (or "PIN number") which is stored on the access token. For the access token 100 to be usable, the access token provides data only if a corresponding PIN number is received by the access token 100. In this way, the PIN number ensures that the access token 100 is only used by a person who owns the access token or otherwise authorized to use it. A thief who steals both a computer system and the access token to the computer system is unable to access the computer system due to an inability to provide the corresponding PIN number contained in the access token 100.

When a person places the access token 100 on the access token reader 120, security software within computer system 150 is invoked and prompts the user to enter the PIN number 130 on an input device 140. The security software program code may be embedded within the basic input-output system that is stored along with the CMOS settings 180 in nonvolatile memory within computer system 150. In this way, the BIOS may operate without exposing data on nonvolatile storage device 195. In one example, the input device 140 is a keyboard upon which the user enters a PIN number. In another example, the input device 140, is a biometric reader that reads biometric data from the user. In a specific example, biometric data is a fingerprint and an input device 140 is a fingerprint reader. Another example of biometric data is eye retina data that is read with an eye scanner. Another example of biometric data is voice data that is spoken into an input device 140, such as a microphone, and compared with a voice print of the user.

In another example, the access token 100 includes signals located on a device connected to computer system 150 through a computer network. The access token reader 120 includes a communications device such as a modem or network card enabling computer system 150 to receive signals from the device containing access token 100. When computer system 150 is initialized or resumed, security software within computer system 150 sends a signal through access token communicator 120 to a device containing access token 100. In response to the signal, the device transmits the access token 100 to computer system 150 through access token communicator 120. To protect the access token data integrity, access token 100 may be encrypted with standard encryption technologies, such as RSA, with the encryption key located on nonvolatile storage within computer system 150. When computer system 150 receives the encrypted access token 100 the computer system 150 uses the secret key located in CMOS or the nonvolatile memory to decipher the access token data.

In another example, nonvolatile memory 190 includes hidden registers and hidden storage capabilities. Policies and passwords are stored in hidden storage areas of nonvolatile memory 190. Nonvolatile memory 190 releases the stored hidden data in response to receiving a password or secret code. Hidden register and hidden storage capabilities of nonvolatile memory 190 act similarly to a smart card releasing access token data in response to receiving a secret code. Access token 100 is stored within hidden storage areas of nonvolatile memory 190 and released when nonvolatile memory 190 receives access code 130.

In another example, default access token data is stored in nonvolatile memory 190 or memory containing CMOS settings 180. Passwords are stored in nonvolatile memory 190 ensuring that only authorized users with a proper access code or codes 130 are allowed into the system. The processor 160 is set to System Management Mode (SMM) and communicates directly with micro-controller 170 to perform security checks. A SMM handler sends commands to the micro-controller 170 to check whether a password is installed in computer system 150 and, if a password has been installed, to prompt the user to provide a corresponding access code 130 through input device 140.

There are several possible states during which the SMM handler within processor 160 checks to determine whether a password is installed on computer system 150. Three of the states occur within a CMOS setup program that runs in the SMM and is responsible for CMOS settings 180. A fourth check is during processing of the System Management Interrupt (SMI) which occurs when computer system 150 is turned on and booted. A fifth check is in the SMI that executes when computer system 150 resumes from a suspended state.

Micro-controller 170 may be used to isolate processor 160 from access code 130 entered by a user. When processor 160 signals micro-controller 170 that authorization data is needed, micro-controller 170 receives the input from input device 140 and simply returns a "pass" or "fail" to processor 160. Alternative examples of computer system 150 may substitute a second processor for micro-controller 170 or may use processor 160 to perform the desired security checks. An advantage of isolating the security functionality onto micro-controller 170 is that processor 160 does not need to handle or be exposed to access code 130.

In one example, nonvolatile storage device 195 contains a password protection mechanism that prevents use of nonvolatile storage device 195 by anyone that does not possess the correct password. One example of a nonvolatile storage device 195 that is password protected is the ATA-3 type hard disk drive (HDD). Password protecting nonvolatile storage device 195 allows protection of the data contained on the device separate from protecting use of computer system 150. In many computer systems, especially notebook computer systems, the hard disk may be easily removed from the computer system. An unauthorized person without access to computer system 150 can, in some cases, remove nonvolatile storage device 195 and place the storage device into a different computer system for which he does have access. Password protecting nonvolatile storage device 195 might not prevent someone from taking the physical nonvolatile storage device 195 but would deter and prevent that person from being able to use and access the device, thus protecting data stored therein.

In one example, nonvolatile storage devices 195 that support security features are identified by examining the 128th word returned by the ATA Identify Device command. The layout of this word is described in the following table.

TABLE 1

Security Capability Identification

| Bit | Description |
| --- | --- |
| 0 | Security capability is supported if 1 |
| 1 | Enabled if 1 |
| 2 | In locked state if 1 |
| 3 | In frozen state if 1 |
| 4 | Attempt count expired if 1 |
| 5–7 | Reserved |
| 8 | Security level is maximum if 1 |
| 9–15 | Reserved |

In this example implementation, a drive supporting the security capability is in one of five states at any given time. These states are reflected by the first four bits of the word described in Table 1, and are shown in Table 2:

TABLE 2

Drive Security States

| Bits 3-0 | State Description |
| --- | --- |
| 0001 | Disabled-no drive password has been set |
| 0011 | Enabled-drive password is set |
| 0111 | Locked-drive password is set and the system just powered on |
| 1011 | Frozen enabled-drive password set and password commands are disabled |
| 1001 | Frozen disabled-no drive password has been set and password commands are disabled |

A drive in the Disabled state acts primarily like a drive that does not support the security features, but responds to any of the six security commands if issued.

A drive in the Enabled state acts like a drive that does not support the security features, but enters the Locked state when next powered on if the device remains in the Enabled state until powered off. The device in the Enabled state also responds to the security commands if issued.

In the Locked state a drive will not read from or write to the drive's media. Additionally, a drive in the Locked state responds to a subset of the security commands: Security Erase Prepare, Security Erase Unit, and Security Unlock. A Locked drive will only allow five attempts at unlocking with the Security Unlock command. After five failed attempts, the Locked drive refuses all drive password commands until the power is removed and restored.

A drive in a Frozen Enabled state acts like a drive that does not support the security features, with two exceptions: the Frozen Enabled device responds to the Security Erase Prepare command and the Frozen Enabled device enters the Locked state when next powered on. The Frozen Enabled drive does not respond to any of the security commands that set or modify drive passwords or attempt to disable the security feature.

A drive in Frozen Disabled state acts like a drive that does not support the security features, but a Frozen Disabled device responds to the security command Security Erase Prepare. The Frozen Disabled drive does not respond to the security commands that set or modify drive passwords or attempt to enable the security feature.

Commands used with the security feature include Security Disable Password, Security Erase Prepare, Security Erase Unit, Security Freeze Lock, Security Set Password, and Security Unlock. The Security Disable Password command removes a drive password from the drive, thus placing the drive into the Disabled state. The Security Disable Password fails unless the drive is already in the Disabled state or is in the Enabled state, and a correct drive password is provided.

The Security Erase Prepare command is used prior to either the Security Erase Unit or the Format Unit command. No drive password is needed to execute the Security Erase Prepare command.

The Security Erase Unit command initializes all user sectors and then removes the drive password, putting the drive into the Disabled state. A drive password is required to execute the Security Erase Unit command. In addition, the Security Erase Unit command is preceded by a Security Erase Prepare command. During the Security Erase Unit command, the user area of the drive is overwritten with zeros, but this write is not verified, and the defective sector information and reassigned sector information are not updated.

The Security Freeze Lock command requires no drive password entry and places the drive into the Locked state. In the Locked state, security cannot be Enabled or Disabled, the Security Erase Unit command will not function, nor can any existing drive passwords be changed.

The Security Set Password command is used to set drive passwords and the security level of the drive. No existing drive password is needed to execute the Security Set Password command—only the desired new drive password is provided as input. When a drive password is set, the drive enters or remains in the Enabled state.

In the illustrative system, setting the user password is the only way to activate the security feature. The Security Set Password command is used to set the drive's security level to one of two defined levels: (1) "high" and (2) "maximum." A difference between the two security levels involves use of the Security Unlock command. When the "maximum" security level is chosen, a master drive password cannot be used with the Security Unlock command to exit from the Locked state (making a master drive password less powerful than a user password). The Security Unlock command transitions the drive from the Locked state to the Enabled state, and uses the user drive password if the drive is in the "maximum" security level. If the security level is set to "high" (instead of maximum"), the master password can also be used with this command. Each time the Security Unlock command is executed with an incorrect drive password, the drive decrements a counter. After the fifth failure, the drive rejects further security commands until the drive is power-cycled.

In the example implementation, Table 3 shows that, if a command is not shown to transition out of some state, then that command either cannot be executed successfully in the state, or execution of the command does not cause a state transition. Note that power cycle is shown as a command where it causes a state transition. In addition, where "user" ("master") is shown in italics, then the user (master) password is provided in order to execute the command.

TABLE 3

Security State Transitions

| State | Command | Next State |
|---|---|---|
| Disabled | Set (master) Drive Password | Disabled |
| | Set (user) Drive Password | Enabled |
| | Freeze Lock | Frozen Disabled |
| Enabled | Set (master | user) Drive Password | Enabled |
| | Freeze Lock | Frozen Enabled |
| | Disable (user | master) | Disabled |
| | Power cycle | Locked |
| Frozen Enabled | Power cycle | Locked |
| Frozen Disabled | Power cycle | Disabled |
| Locked | Unlock (user) | Enabled |
| | Unlock (master) if security level is high | Enabled |
| | Erase Unit (user master) | Disabled |

In the example implementation, when the BIOS 180 detects a drive that supports the security features described above, BIOS 180 determines how security policies are handled.

The foregoing components and devices are used herein as examples for sake of conceptual clarity. As for (non-exclusive) examples, processor 160 is utilized as an exemplar of any general processing unit, including but not limited to multiprocessor units. The 8051 micro-controller 170 is utilized as an exemplar of any micro-controller, including but not limited to general processors. CMOS settings 180 is utilized as an exemplar of any non-volatile means to store computer system settings. Non-volatile memory 190 is utilized as an exemplar of any storage medium that retains data and is accessible by a processor or micro-controller, including but not limited to read only memory (ROM), erasable programmable read only memory (EPROM), and electrically erasable programmable read only memory (EEPROM). Non-volatile storage device 195 includes, but is not limited to, a hard disk drive, a CD-ROM drive, a RAID subsystem, a floppy disk drive, a DVD drive, or any device that stores data in a non-volatile state (i.e., when power to the device is removed).

Access token 100 includes both device-type tokens (i.e., smart cards, key cards, badges, and credit cards, etc.) and logical tokens (i.e., data stream provided to a port on the computer system, data stream provided over an intranet or over the Internet, data stream provided to a modem on the computer). In addition, access token 100 may include time sensitive data limiting the operability of access token 100 after an amount of time. Time sensitive access token 100 ensures that the user periodically receives a new access token and thereby limits access to computer system 150 by out of date or old access tokens 100. Access token communicator 120 includes any device used to provide access token 100 to computer system 150, including but not limited to a smart card reader, a key card or badge reader, a credit card scanner, a modem, an infrared signal reader, a serial or parallel port, and universal serial bus ports. Access code 130 includes, but is not limited to a PIN number or password, a biometric data element (i.e., a fingerprint or eye-scan).

Input device 140 includes any device used for entering access code 130, including a keyboard, a fingerprint scanner, and an eye-scanner. Finally, computer system 150 is exemplified as a personal computer system, in particular a laptop, or notebook, computer system that is capable of being easily moved by a user. Other embodiments of computer system 150 may include different types of computer systems including, but not limited to, mainframes, minicomputers, workstations, servers, personal computers, notepads, ATMs, communication nodes, computerized dispenser, point-of-sale (POS) terminal, personal-information-managers (PIMs), and embedded systems.

A typical computer system includes at least one processor 160, associated memory and a number of input/output (I/O) devices. A computer system processes information according to a program and produces resultant output information via the I/O devices.

A program is a list of internally stored instructions such as a particular application program and/or an operating system. A software module may include a program. The programs that control the operation of a computer system are commonly referred to as software applications or simply software.

Consequently, as used herein these specific exemplars are intended to be representative of their more general classes. Furthermore, in general, use of any specific exemplar herein is also intended to be representative of its class and the non-inclusion of such specific devices in the foregoing list should not be taken as indicating that limitation is desired.

Figure 2:
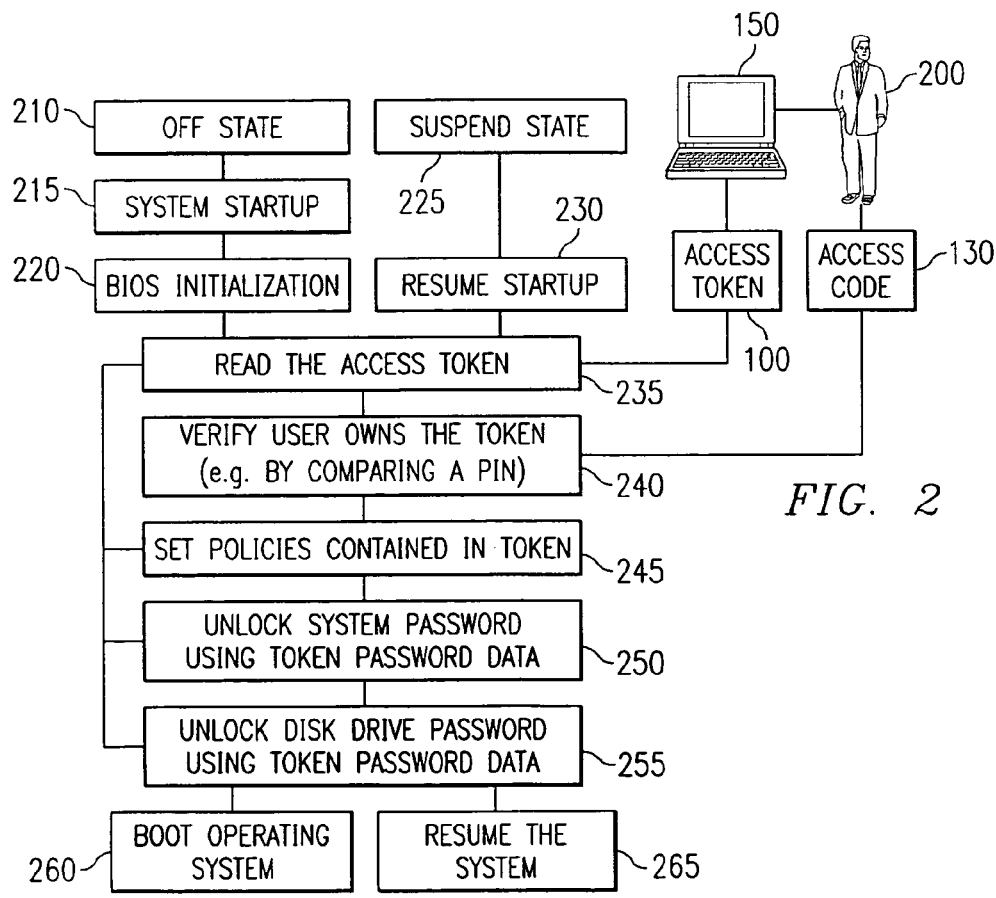
FIG. 2 is a flow diagram of a user using an access token and an access code to access a computer system.

FIG. 2 depicts a flow chart illustrating steps taken in accessing computer system 150 by user 200. Computer system 150 is started from the off state 210 typically by switching a power switch on computer system 150 to the "on" position. Power is supplied to computer system 150 during system startup 215. During system startup 215, an electrical signal follows a path to the processor to clear leftover data from the processor's internal memory registers and resets a program counter in the processor to a specific address of the next instruction to be processed. This address is the beginning of the BIOS system—a boot program that is stored in non-volatile memory and contains the computer system's basic operating system.

During BIOS initialization 220, a series of system checks are performed, including testing the processor for proper operation, sending a signal over the system bus to ensure components of computer system 150 are working, and testing the memory and random access memory (RAM). During BIOS initialization 220, access token 100 is read. The BIOS code contains instructions acquiring an access token for usage by the computer system before allowing the BIOS to load the operating system that is contained on the hard disk or other non-volatile storage device. When access token 100 is read, the BIOS performs instructions to verify that user 200 is an authorized user of access token 100. In one example, access code 130 includes a PIN number that is contained on access token 100 and is entered by user 200 onto a keyboard-type input device. The BIOS instructions pass the access code 130 entered by user 200 to the access token communicator 120 which compares the entered access code 130 to the access token 100. If the access code 130 entered by user 200 matches the access code contained in the access token 100, access token responds by passing policies and other access token data to computer system 150 through access token communicator 120. The access token data is received by the BIOS program which uses the data to set policies in computer system 245.

Example uses of policies include setting flags indicating (1) whether user 200 is authorized to change the access code or password; (2) whether the user can delete the requirement for a boot password; (3) whether user 200 is authorized to change or delete the password contained on a non-volatile storage device, such as an ATA-3 disk drive; (4) the hard disk drive (HDD) security level of the computer system 150; (5) whether the manufacturer controls the master password for the computer system; (6) the format of the password—for example how many characters are required for a password, how many of which have to be numeric and how many are alpha-numeric, etc.; (7) the frequency of which user 200 has to change his or her password; and (8) whether an access code 130 is required. If an access code 130 is required, policies further include flags indicating which access codes are required (i.e., computer system password, nonvolatile storage device password, etc.).

Once policies contained in token operation 245 have been set, the BIOS program instructions unlock the system password using token password data in operation 250. In one example, a system password for computer system 150 includes data contained on access token 100 which is read by access token communicator in response to user 200 providing the correct access code 130 as described above. In another example, providing access token 100 and corresponding access code 130 causes BIOS program to display a separate system password entry screen of a password which is maintained by computer system 150. In this way, the verified owner of a token is the only person allowed to enter the system password for a computer system. Combining an access code 130 and a separate system password could be used forcing two knowledgeable persons (one person who owns the access token 100 and another person who maintains the computer system password) to be present to access a more highly-secured computer system containing highly sensitive enterprise data.

Once the computer system has been unlocked in operation 250, the non-volatile storage device is unlocked in operation 255. In one example, non-volatile storage device 195 is a secure drive, such as an ATA-3 type hard disk drive. As described with respect to the discussion of FIG. 1, secure drives respond to a command set which include commands for setting the drive to various states of operation. A drive password is supplied to the secure drive to enable the drive for use by the user 200. Once the drive is enabled for use by the user 200, the BIOS code boots the operating system in operation 260 and the operating system, such as Windows 95™ or Windows NT™, is read from the non-volatile storage device 195.

During operation of the computer system 150, the system may enter a suspended state 225 of operation. A suspended state 225 is entered by the user pressing a "suspend/resume" button on computer system 150 or by the BIOS invoking a suspended state 225 by a criteria included in the CMOS settings set by the manufacturer or user 200 (i.e., suspend if computer system 150 battery life less than 5 minutes, suspend if computer system 150 receives no input from user within 10 minutes, etc.). When computer system 150 enters a suspended state, computer system 150 is reactivated by user 200 by either turning the computer off and back on again, in which case system startup 215 operation is activated and the above-described operations steps take place, or the user presses the "suspend/resume" button to resume using the computer system 150, as is shown beginning in resume startup operation 230.

When resume startup operation 230 is complete, the security checkout procedures described above take place (i.e., read the access token operation 235, verify token ownership operation 240, set policies contained in token operation 245, unlock system operation 250, and unlock disk drive password operation 255) before the system is resumed in operation 265. When the system is resumed in operation 265, computer system 150 contains the operating system in the same state that existed at the time the suspended state 225 was entered (i.e., the user desktop and opened applications appear as before computer system entered the suspended state).

Figure 3:
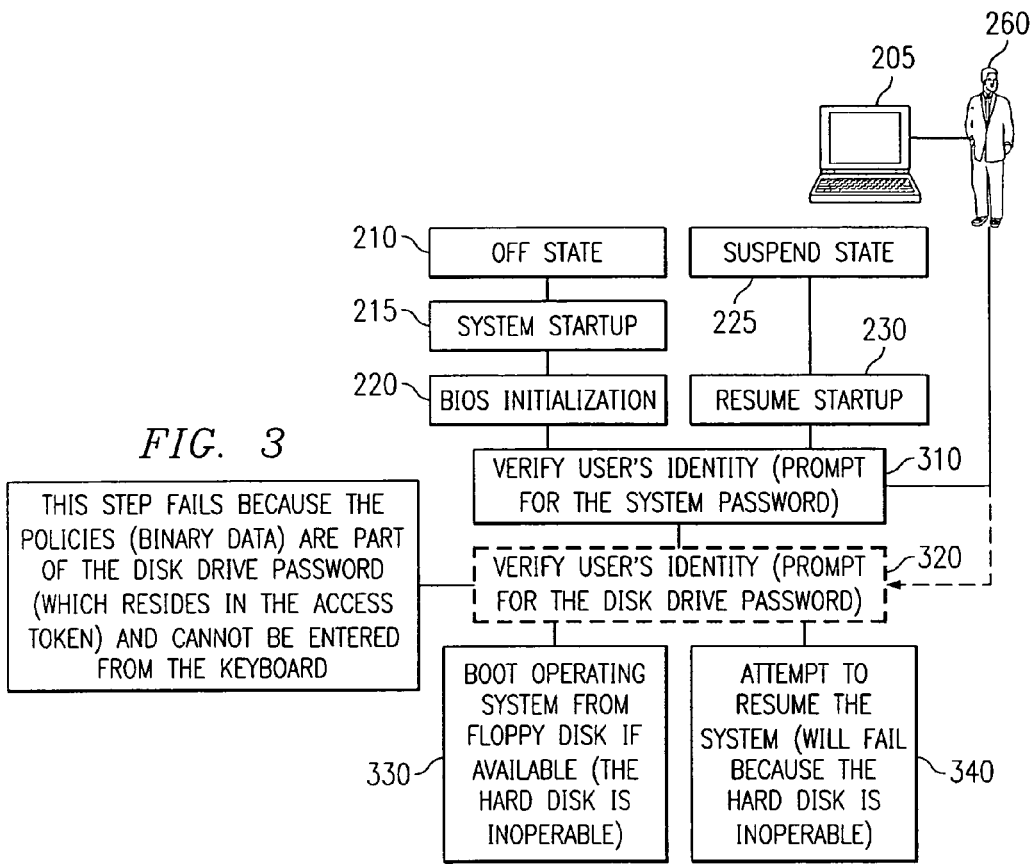
FIG. 3 is a flow diagram of a security system preventing a user from accessing a nonvolatile storage device when security policies are not in force by enforcing policies as part of a nonvolatile storage device password.

FIG. 3 depicts a flow chart illustrating operations performed to prevent the user 200 from accessing a secure nonvolatile storage device 195 contained within computer system 150. In this example, the user is unable to access the nonvolatile storage device 195 from either an off state 210 or a suspended state 225 since the user 200 is unable to provide the access token. In this example, the user's identity is provided by entering a system password in operation 310 to access computer system 150. In this example, however, a secure nonvolatile storage device 195 is used within computer system 150 to store data, and the drive password for storage device 195 includes binary data (i.e., data that cannot be entered from the keyboard). User 200 does not have the access token and is unable to enter the required drive password on the keyboard. The drive password (containing the binary data) is contained on the access token, so the user is unable to access the storage device 195 without the proper access token. The user 200 is unable to provide a correct drive password at step 320, so computer system 150 does not boot in operation 330 nor does the computer system resume from a suspended state in operation 340.

Figure 4:
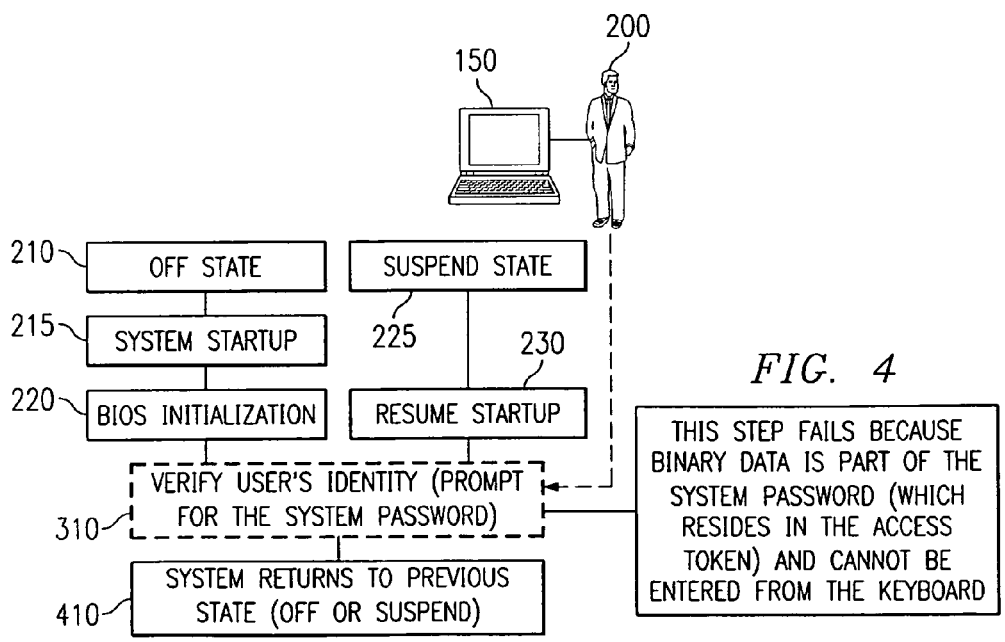
FIG. 4 is a flow diagram of a security system preventing a user from accessing a computer system when security policies are not in force by including binary data in a system password.

FIG. 4 depicts a flow chart illustrating operations performed to prevent the user 200 from accessing computer system 205 from either an off state 210 or a suspended state 225 if the user 200 is unable to provide the access token. In this example, the computer system 150 has a system password including binary data (i.e., data that cannot be entered from the keyboard). During either the system startup operation 215 or resume startup 230, the system password is acquired from the user 200 before computer system 205 executes instructions past the system password entry screen that is displayed in operation 310. Because user 200 does not have access token 100, the user is unable to provide the system password in operation 310 and the system returns to the initial state (i.e., Off State 210 or Suspend State 225) in operation 410. Because the system password contains data that cannot be entered from the keyboard, user 200 is unable to provide the system password without the access token 100. In this example, access token 100 contains binary data matching the system password installed on computer system 150.

Figure 5:
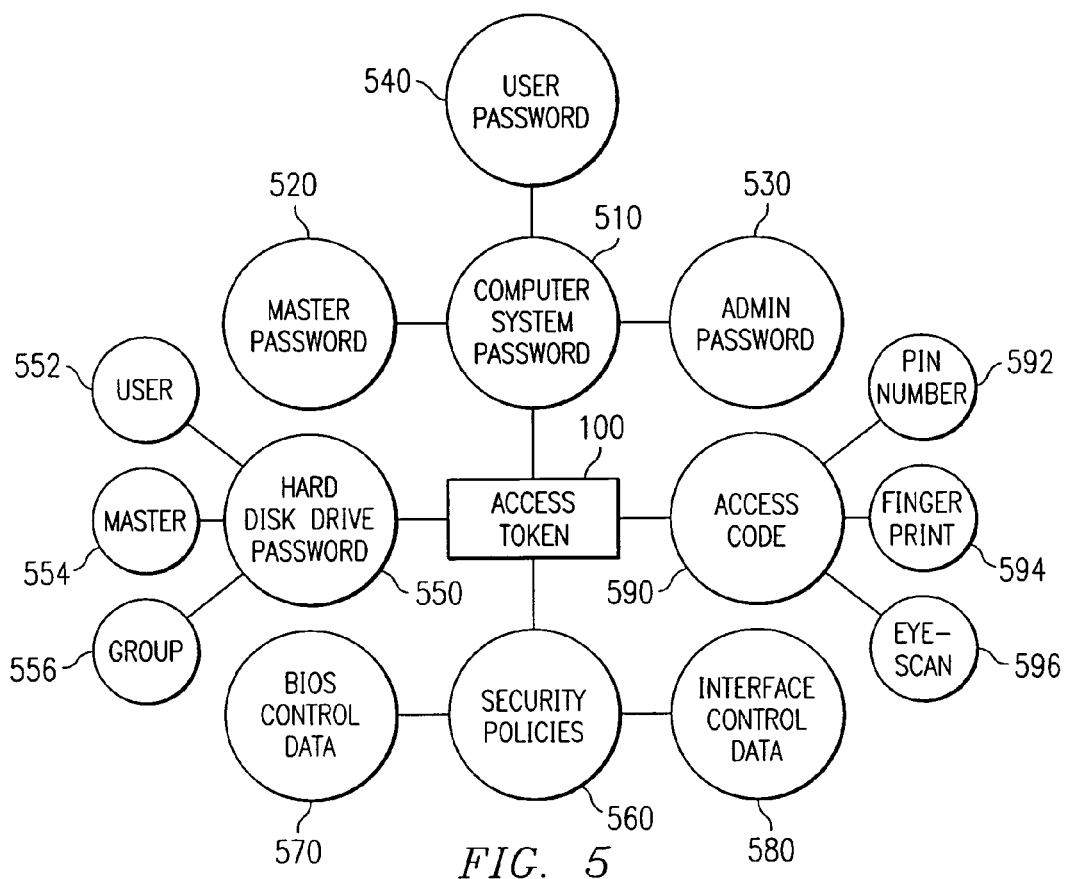
FIG. 5 is a data model showing data elements and types associated with an access token.

FIG. 5 depicts data elements included in an example access token 100. Access token 100 includes computer system password data 510, hard disk drive password data 550, and security policies 560 used by a computer system. Computer system password 510 includes data sub-types. In the example shown, computer system password 510 includes data sub-types of a master password 520, an administration password 530, and a user password 540 used with computer system 150. These passwords are used to access computer system 150, for example, when computer system 150 prompts the user for the system password in step 310 of FIG. 4. As described in the discussion of FIG. 4 above, the system password optionally includes binary data to prevent the password from being entered from the keyboard. Computer system password 510 associated with access token 100 uses a corresponding format, i.e., a binary data format, that is transmitted to computer system 150 through access token communicator 120 (shown in FIG. 1). The data sub-types describe different types of computer system passwords. For example, computer system 150 uses a master password 520 to perform certain activities (i.e., reset the user password 540 and admin password 530). The computer system uses an admin password 530 to perform other activities, or perhaps a subset of activities allowed by the master password 520 (i.e., change CMOS settings, change admin password 530 or user password 540). The user password 540 allows the user to perform more limited activities (i.e., access to computer system 150 and ability to change user password 540). Authorized use of access token 100 is used with access code 130 (shown in FIG. 1) verifying the identity of the holder of access token 100. In the example, access code 590 is associated with access token 100 to verify the user's identity using one or more data sub-types such as PIN number 592, fingerprint data 594, and eye-scan data 594.

Also associated with access token 100 is the hard drive password 550 which is used by access token 100 to unlock a nonvolatile storage device 195 located on computer system 150 (see FIG. 1). Nonvolatile storage device 195 includes a security feature restricting access based on a password associated with the storage device. Data sub-types for hard disk password 550 include user HDD password 552, master HDD password 554, and group HDD password 556. Nonvolatile storage device 195 includes two passwords—a user password and a master password. Some hard drive security commands, such as the commands discussed in the description of FIG. 1, use either the user or the master password before permitting execution. An access token 100 containing only a user HDD password 552 enables the user to execute security commands using the user HDD password as a parameter. Likewise, an access token 100 containing only a master HDD password 554 enables the user to execute security commands using the master HDD password as a parameter. Additionally, an access token containing both a user HDD password 552 and a master HDD password 554 enables the user to execute security commands using either password as a parameter. The group HDD password 556 contains password data for a shared or group HDD and is shared amongst a group of users. In this manner, a first access token provides access to a first private nonvolatile storage device and a group nonvolatile storage device. A second access token does not provide access to the first private nonvolatile storage device but does provide access to the group nonvolatile storage device.

Security policies 560 are also associated with access token 100. Security policies 560 include data sub-types of BIOS control data 570 and interface control data 580. Security policies 560 established for a business organization include procedures and protocols for accessing and using computer system 150. Because access token 100 is used to access computer system 150, security policies 560 are transmitted to computer system 150 along with computer system password 510 and hard drive password 550. Security policies 560 use enterprise security models generated by the organization so that computer system 150 uses the enterprise security models regardless of the location of computer system 150. For example, a policy may be established requiring a computer system password 510 to access computer system 150. In this case, a user may have the ability to change the user password 540, but does not have the ability to erase the system password. Data sub-type BIOS control data 570 include policies relating to BIOS settings and the user's ability to modify BIOS settings. Data sub-type interface control data 580 include policies relating to screen interfaces accessible to the user.

Figure 6:
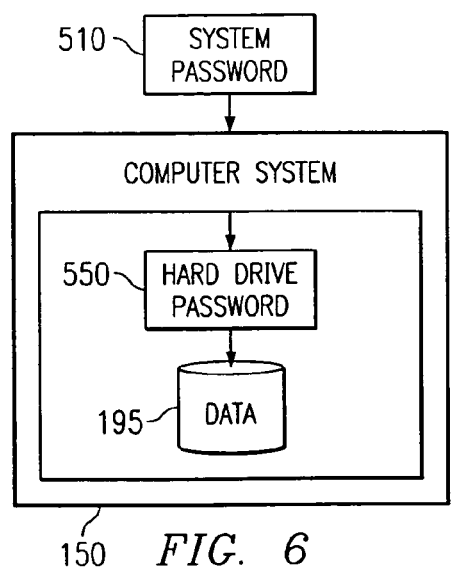
FIG. 6 is a block diagram showing a hierarchical security system for protecting a computer system and a nonvolatile storage device.

Referring to FIG. 6, a block diagram depicts the password hierarchy related to computer system 150. System password 510 is provided by the access token 100 to access computer system 150. Hard drive password 550 is provided by access token 100 to access nonvolatile storage device 195. The layered, hierarchical approach provides flexibility to organizations securing corporate assets. For example, an organization may grant any person with a corporate access token the ability to access any computer system owned by the organization but limits individual user's ability to access data. Someone outside the organization (i.e., without an authorized access token) is unable to access any computer system owned by the organization because that person is not able to provide the system password 510. Someone in the organization with an authorized access token 100, would be able to access any computer system owned by the organization using the system password 510 associated with access token 100. Once computer system 150 is accessed, the ability of the user to access nonvolatile storage device 195 depends on the association between the device and the hard drive password 550 contained on the user's access token 100. If the nonvolatile storage device 195 is the user's private drive, then the access token includes the user HDD password 552 allowing the user access to the device. If the nonvolatile storage device 195 is part of a group accessible by the user, then the user's group HDD password 556 corresponds to the password associated with the device and permit access. On the other hand, if the user's access token does not contain a hard disk drive password 550 corresponding to the nonvolatile storage device 195, then the user is denied access to the device and the data contained on the device.

Figure 7A:
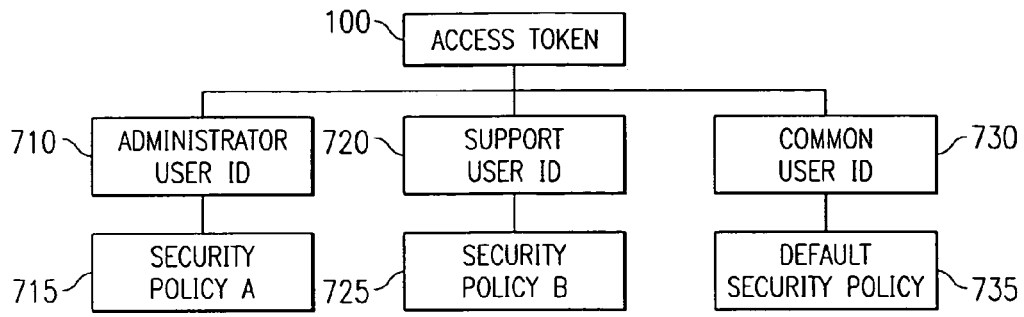
FIG. 7A is a block diagram showing user types and policies associated with an access token.
Figure 7B:
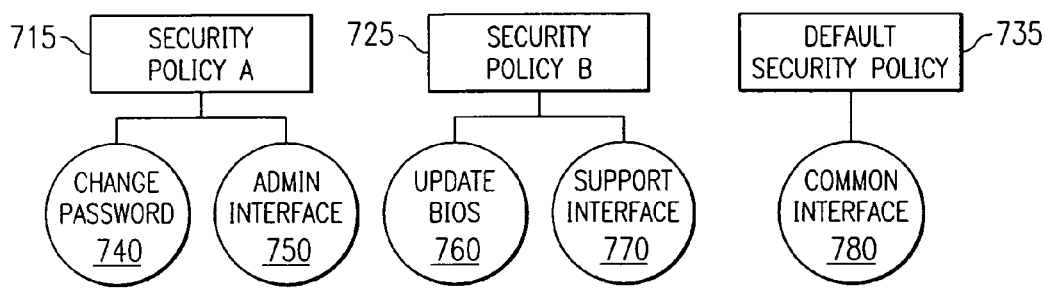
FIG. 7B is a data model showing policies and interfaces associated with the security policies from FIG. 7A.

FIG. 7A is a schematic block diagram that depicts access token 100 which is coded with several types of information. Administrator User ID 710 includes passwords described in the discussion of FIG. 5 for accessing a computer system by an administrator. Administrator User ID 710 includes a computer system password 510, a hard drive password 550, and an access code 590. The passwords and codes include data sub-types as described in the discussion of FIG. 5. Security Policy A 715 includes security policies allowing performance of administrator functions on the computer system. As shown in FIG. 7B, Security Policy A defines access to the ability to change passwords 740 on computer system and the ability to access admin interface 750 to perform administrative functions on the computer system.

Referring again to FIG. 7A, Support User ID 720 includes passwords described in the discussion of FIG. 5 for accessing a computer system by a Support Person (i.e., to perform diagnostics, etc). Support User ID 720 includes a computer system password 510, a hard drive password 550, and an access code 590. The passwords and codes include data sub-types as described in the discussion of FIG. 5. Security Policy B 715 includes security policies allowing performance of Support functions on the computer system (i.e., change BIOS settings, run diagnostics). As shown in FIG. 7B, Security Policy A defines access to the ability to update BIOS 760 on computer system and the ability to access a support interface 760 to perform support functions on the computer system.

Referring again to FIG. 7A, Common User ID 730 includes passwords described in the discussion of FIG. 5 for accessing a computer system by a Common User (i.e., to use applications loaded on computer system, etc). Common User ID 730 includes a computer system password 510, a hard drive password 550, and an access code 590. The passwords and codes include data sub-types as described in the discussion of FIG. 5. Default Security Policy 735 includes security policies allowing performance of Common functions on the computer system. As shown in FIG. 7B, Common Security Policy includes the ability to access a common interface 780. The Default Security Policy 735 is stored on nonvolatile memory 190 shown in FIG. 1. Users accessing computer system 150 load Default Security Policy 735 unless the access token 100 provides alternate policies (i.e., Security Policy A, Security Policy B, etc.) to use on computer system. In this example, any user in an organization may have the ability, using their access token, to use applications loaded onto a common computer system utilizing the Default Security Program loaded in nonvolatile memory on the computer system. However, the user does not have the ability to change passwords used to access computer system 150 nor would the user have the ability to change BIOS settings and perform other administrative or support tasks. The access token 100 used by an administrative or a support user includes policies that over-ride the default security policies loaded into nonvolatile memory. The hard drive password 550 (shown in FIG. 5), in this case a group HDD password 556, is stored for each user in the organization authorized to use computer system.

Because users of computer system 150 have access token 100 with the group HDD password 556 (shown in FIG. 5), any authorized user with an access token 100 can use the computer system. People outside the organization, i.e., without an authorized access token 100, are unable to access data stored on nonvolatile storage device 195 associated with computer system 150. If a common computer system used by several people in an organization (i.e., a shared notebook computer) is stolen but the above-described security measures are imposed, the thief does not have the access token 100 needed to unlock the storage device 195 and is unable to access data stored on the storage device 195. Additionally, even if the thief was able to steal both the computer system 150 and the access token 100, he would be unable to use the access token as he is not an authorized user (i.e., he would not be able to provide the access code 590 used with the access token 100 as shown in FIG. 5).

Figure 8A:
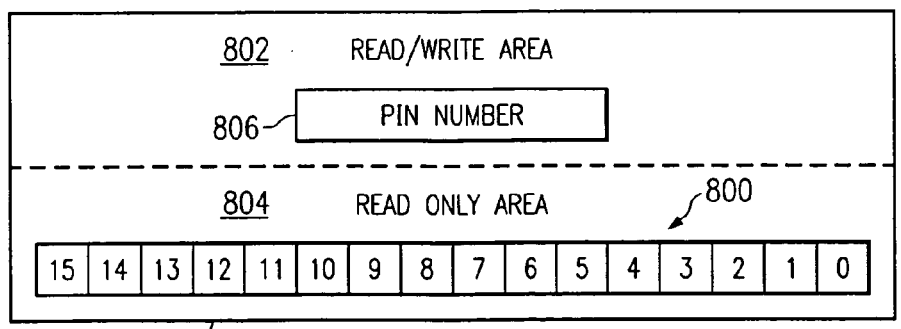
FIG. 8A is a diagram showing an example implementation of an access token.
Figure 8B:
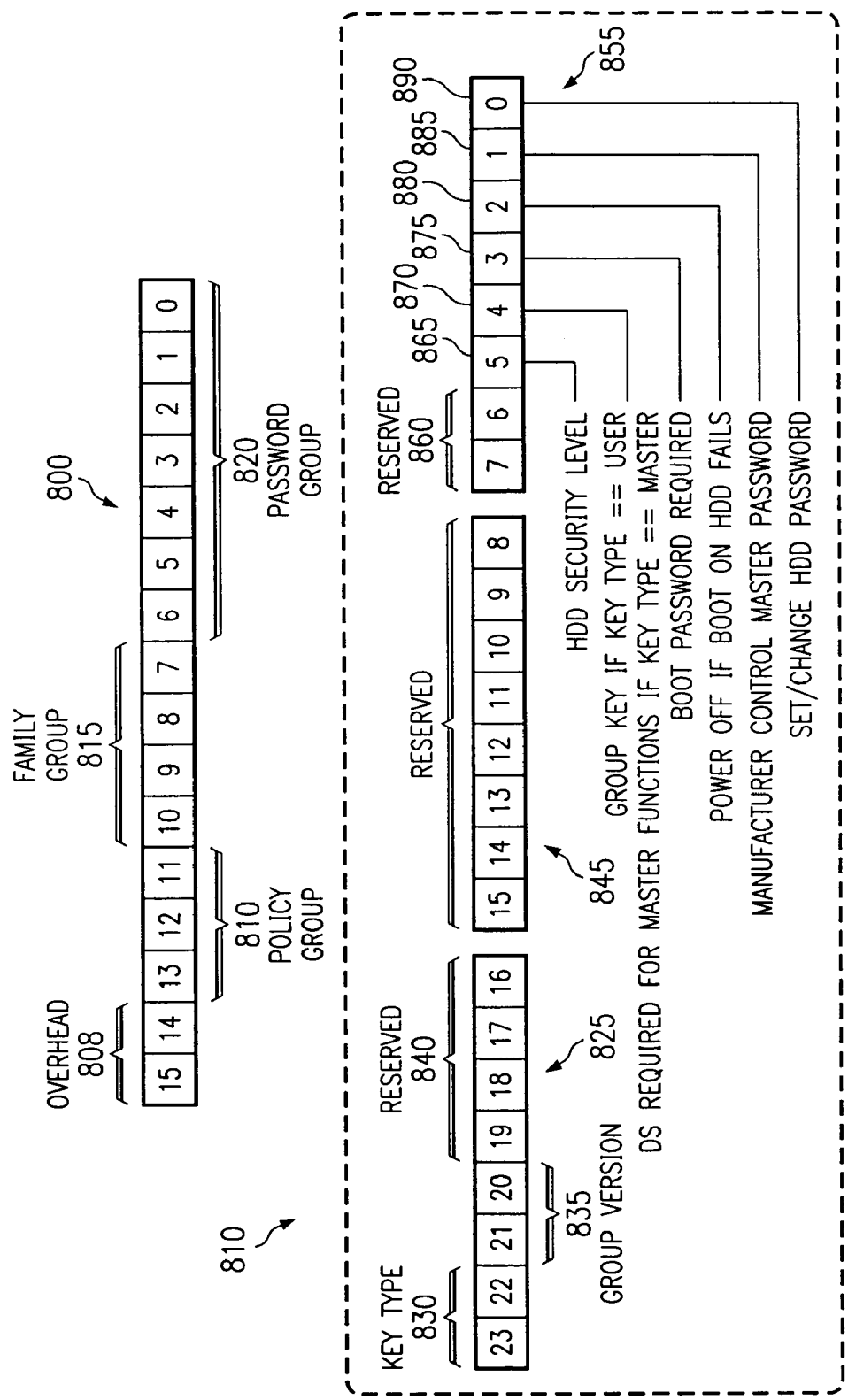
FIG. 8B is a diagram showing an example implementation of policy data on the access token shown in FIG. 8A.

FIGS. 8A and 8B depict an example implementation of an access token 100. FIG. 8A depicts access token 100 as a smart card that is divided into a read/write area 802 and a read only area 804. PIN number 806 is stored within the read/write area 802 of the access token 100. In this way, a user can periodically change their PIN number to prevent the access token 100 from being compromised if a third party learns of the PIN number. For example, if someone on an airplane watches while the user enters the PIN number onto a notebook computer system, the user can change the PIN number so that the third-party would be unable to access the computer system even if the third party was able to steal both the notebook computer system and the access token. The read only area 804 of access token 100 contains access control data 800. Access token 100 supplies access control data 800 to a computer system in response to the computer system providing access token 100 with a data stream corresponding to PIN number 806. When the user enters the PIN number on the keyboard, the computer system, for example, through the access control communicator 120 shown in FIG. 1, sends the data entered by the user to access token 100. If the data entered by the user corresponds with PIN number 806, then access token 100 sends access control data 800 back to the computer system through access token communicator 120. As is known by those skilled in the art, access token data 800 is inaccessible to anyone who does not provide the correct PIN number by employing smart card technology or data encryption technology to prevent an unauthorized person from reading the access token data 800 stored on access token 100.

In the illustrative example, access token data 800 contains 16 bytes of data as further shown in FIG. 8B. Access token data 800 is divided into groups of information. The overhead group 808 contains two bytes (bytes 14 and 15 of access token data 800) of information used by the access token device independently from data sent to computer system (i.e., length of data packet, smart card information, etc.). Policy group 810 contains three bytes (bytes 11, 12, and 13) of data. First policy group byte 825 (byte 13 of access token data 800) includes a key type 830 containing two bits of data (bits 23 and 22), a group version 835 containing two bits of data (bits 21 and 20), and four bits of reserved space 840 (bits 16 through 19). Key type 830 contains data indicating the type of access token with four possible key types (e.g., 00=service key, 01=user key, 10=admin key, and 11=master key). Group version 835 contains data identifying which group version is contained on access token 100 (i.e., the first group version is '00', the second group version is '01', etc.).

Reserved group 840 (bits 8 through 15) is available for future policy considerations. Policies are incorporated into the security model and into the BIOS of computer systems reading the access token (i.e., require PIN number to be a least six characters long, etc.).

The second byte 845 (byte 12 of access token data 800) of policy group 810 contains eight more bits of reserved space available for future policy implementations.

The third byte (byte 11 of access token data 800) of policy group 810 contains two more bits of reserved space 855 (bits 6 and 7) and six more bits of policy information. Set/change HDD password bit 890 (bit 0) contains a flag indicating whether user can change the password associated with the hard disk drive (the drive password).

Manufacturer control master password bit 885 (bit 1) contains a flag indicating whether the manufacturer retains a master key for the hard disk drive. The computer system manufacturer uses a master key to access the hard drive if the user loses the access token(s) programmed to unlock the hard disk drive, in which case the manufacturer control master password bit 885 is set to the 'on' or 'true' setting (i.e., '1'). In some cases, however, the corporate customer may choose to manage the master keys used with hard drives and the manufacturer does not control the master drive password. In this case manufacturer control master password bit 885 is set to the 'off' or 'false' setting (i.e., '0'). The next policy bit, power off if boot on HDD fails bit 880 (bit 2) powers off the computer system if the flag is set (i.e., '1') and the HDD is inaccessible because it was not properly "unlocked." The boot password required flag 875 (bit 3) when set, requires a boot password to be set for the computer system and does not allow the user to delete the boot password. The next bit, flag 870 (bit 4), has alternate functions depending on the key type 830 used for the access token 100. If key type 830 is a "user" type (i.e., ='01') then flag 870 indicates whether the security key is a group key (i.e., flag 870 is true or '1') or if security key is a user key (i.e., flag 870 is false or '0'). On the other hand, if key type 830 is a "master" type (i.e., ='11') then flag 870 indicates whether a digital signature (DS) or password is required for master functions. The last policy bit shown, HDD security level 865 (bit 5), indicates whether the hard disk drive uses "maximum" security level (i.e., ='1'), or instead uses "high" security level (i.e., ='0'). Disk drive security and uses of maximum and high security levels as described in the discussion of FIG. 1.

The Family Group 815 of access control data 800 includes four bytes of data containing a family group identifier when family groups are used with access token 100. A group identifier is used to provide multiple people access to a common data source (i.e., a common hard drive on a company server). As will be appreciated by those skilled in the art, Family Group 815 can be stored in a variety of ways, including storing the family group identifier as encrypted data that is deciphered with a separate key, such as access code 130 described in the discussion of FIG. 1. If family group key is used, then two bytes from the Password Group 820 are used to identify the individual within the group with the remaining five bytes of the Password Group (i.e., bytes 2 through 6) used in combination with Family Group 815 and two and a half bytes of Policy Group 810 (bits 0 through 19) to form the family group HDD key.

The Password Group 820 includes seven bytes of data from the access token data (bytes 0 through 6) and contains a unique password for access token 100. Similar to Family Group 815, the Password Group 820 data can be stored in a variety of ways, including encrypted forms. If a family group key is used with access token 100, then family group members have similar password group keys. A related group of users (i.e., a department, an office, etc.) typically has the same Password Group 820 data for five of the seven bytes (bytes 2 through 6). The remaining two bytes (bytes 0 and 1) are used to identify the individual user within a group. In this way, portions of access token data 800 operate both as a group HDD key to access a group owned nonvolatile storage device, and as an individual HDD key to access a particular nonvolatile storage device owned by the authorized user of the particular access token.

Figure 9A:
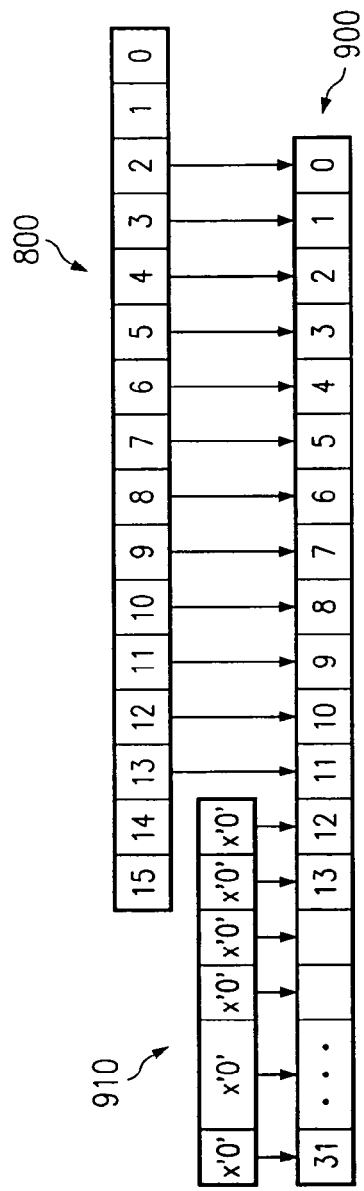
FIG. 9A is a diagram showing an example implementation of access token data used to unlock a nonvolatile storage device accessible by a group.
Figure 9B:
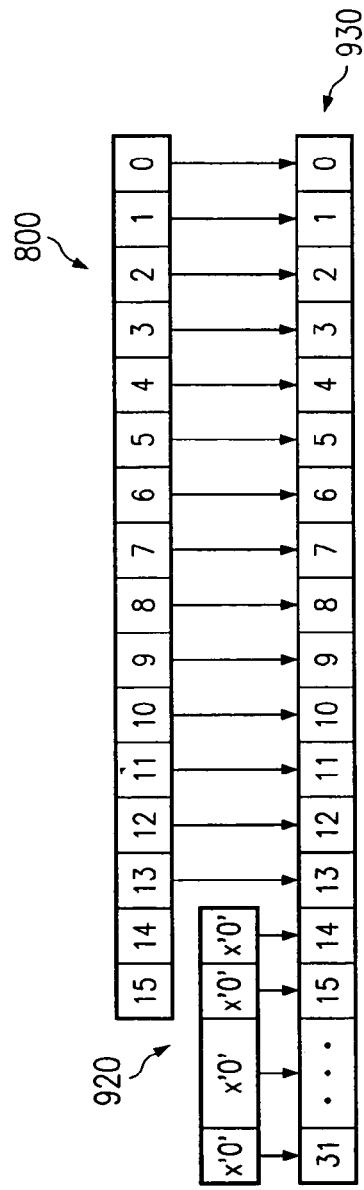
FIG. 9B is a diagram showing an example implementation of access token data used to unlock a private nonvolatile storage device accessible by an individual.

FIGS. 9A and 9B depict the access token data 800 being used to access a group HDD (FIG. 9A) and to access an individual, or private, HDD (FIG. 9B). FIG. 9A shows bytes 2 through 13 used to provide data to form group HDD password data 900. In the example, the HDD password on the nonvolatile storage device is 32 bytes in length. For a group HDD, five bytes of the Password Group (bytes 2 through 6) are combined with the Family Group (bytes 7 through 10) and the Policy Group (bytes 11 through 13). Two bytes from the Password Group (bytes 0 and 1) are not combined since the bytes identify the individual within the group and, therefore, are not be the same for each member of the group. In addition, in byte 13, zeros ('0000') are passed in place of the Key Type 830 and Group Version 835 within First Policy Byte 825 (as shown in FIG. 8B). The zeros are passed because group access is enabled for any type Key Type (i.e., if the access token is for a service key, user key, admin key, or master key) and for any Group Version 835. In addition, the group HDD password data 900 is padded with zeros to match the length of the HDD password on the nonvolatile storage device (i.e., 32 bytes).

FIG. 9B depicts access token data 800 used to create private HDD password data 930 and provide the data to a non-group HDD (i.e., a personal or private drive). In this case, all bytes from the Family Group 815 and Password Group 820 are passed. If access token data 800 is programmed for group functions, access to the HDD is limited to the member within the group who has the individual member identifier (i.e., bytes 0 and 1 from Password Group 820). The Key Type 830 and Group Version 835 within First Policy Byte 825 (as shown in FIG. 8B) are again replaced with zeros so that a "master" access token holder and a "user" token holder can both access the HDD. In this way, if a user leaves the organization or the access token is lost or destroyed, a master access token forms private HDD password data and allows access to the HDD.

In the example, the access token data is limited to 14 bytes (16 bytes less 2 bytes used for access token overhead 808). In other examples, access token data length can be increased to provide even stronger encryption keys to access the HDD. Using Policy Group 810 as part of the HDD password provides security so that the drive cannot be accessed with different (modified) policy bits used during the initial programming of the HDD password.

FIG. 10 shows a flowchart of the steps taken when user tries to access a nonvolatile storage device using an access token 100. The system first makes a simple HDD access request without providing either the group HDD access data 900 or the private HDD password data 930 described in the discussion of FIGS. 9A and 9B respectively. If the first request fail decision in operation 1005 is false (i.e., no password protection exists for the HDD), the HDD is accessed in operation 1010. If the first request fail decision in operation 1005 is true (i.e., some form of password protection exists for the HDD), a second request is made with the group HDD access data 900 being provided to the drive in operation 1015. If the second request does not fail in operation 1020 (i.e., the HDD is a group accessible HDD and the access token belongs to the group) then the HDD is accessed in operation 1030. If the second request fail decision in operation 1020 is true (i.e., the HDD is not a group accessible HDD or the access token does not belong to the same group as the HDD), a third request is made with the private HDD access data 930 being provided to the drive in operation 1035. If the third request does not fail in operation 1040 (i.e., the HDD is a private HDD and the access token has access token data 800 matching the private HDD password) then the HDD is accessed in operation 1030. If the third request fails in operation 1040 (i.e., the HDD does not belong to the access token either as a group drive or as an individual drive), then a return code is provided in operation 1060 indicating that the access token used is not authorized to access the HDD.

In FIGS. 11 and 12, an example manufacturing system is shown providing secured computer systems and access tokens to a customer. In FIG. 11, Customer 1100 provides manufacturer with a secure computer system request 1005 and default policies 1110 desired for the computer system. The manufacturer stores the customer's default policies in a customer default policy file 1115. The requested computer system is assembled 1120 and configured 1125 using default policies received from the customer. The configured default policies are used to write the computer system BIOS 1120, write the system password onto nonvolatile memory within the computer system, and write the HDD password 1140 onto the nonvolatile memory associated with the drive. If the customer requests the manufacturer to retain a master key (in case the customer loses the access token used to access the computer system), the master key of the HDD is written to a customer master keys file 1150. Computer system 1150 configured for security is then shipped to customer 1100. Along with computer system 1150, manufacturer sends access tokens as requested by customer and as described in FIG. 12 below.

FIG. 12 shows an example of a manufacturer preparing access tokens for a customer 1200. The customer would provide a token request 1201 with policies 1205, an optional group name 1210, and a user password request 1215. Token request 1201 may be for an additional access token for a computer system already received by customer or may be associated with a new computer system request as described in FIG. 11 above. Included with the user password request 1215 is the access code 130 shown in FIG. 1 containing data the customer desires to use as an access code, or PIN number, associated with the access token. The access code selected by a user could be a PIN number or could include biometric data (i.e., fingerprint data, eye scan data, etc.) the customer wants associated with access token 100. Additionally, the customer may wish to have the manufacturer create a random access code 1225 to include with the access token. After the access code is determined, access token creation 1230 creates the access token by writing the access code to the access token 1235, and writing policies, group name (if desired), and password data to the access token at step 1240. Following creation of the access token, the token 1245 is sent to the customer and the access code 1250 (i.e., PIN number) used to verify ownership the access token is sent to the customer. If the token 1245 was created for an existing computer system used by customer, the access code 1250 is mailed separately from the access token so that an unauthorized person does not receive both the token and the code needed to use the token, thus giving the unauthorized person access to the computer system.

The description of the invention set forth herein is illustrative and not intended to limit the scope of the invention as set forth in the following claims. Variations and modifications of the embodiments disclosed herein may be made based on the descriptions set forth herein, without departing from the scope and spirit of the invention as set forth in the following claims.

What is claimed is:

1. A method for protecting information stored in an information handling system, said method comprising:
   reading an access token containing a computer system access code and a nonvolatile storage device password integrated within a set of security policies such that alteration of the security policies renders the access code and password inoperative, the security policies comprising at least one security policy selected from the group consisting of policies relating to BIOS settings and policies relating to screen interface access;
   requesting an authentication password from a user;
   authenticating the use of the access token by comparing the password to the security policy;
   setting the security policy in the information handling system; and
   unlocking a nonvolatile storage device on the information handling system using the nonvolatile storage device password.

2. A method for assembling a computer system comprising:
   receiving a list of components for assembling the computer system;
   receiving, from an access token, a computer system access code and a nonvolatile storage device password integrated within a set of security policies such that alteration of the security policies renders the access code and password inoperative, the security policies comprising at least one security policy selected from the group consisting of policies relating to BIOS settings and policies relating to screen interface access;
   configuring the computer system using the set of security policies; and
   accessing the computer system with a user input password combined with the token access code such that the combined passwords match the one or more security policies configured in the computer system.

3. The method of claim 2 further comprising:
   initializing a system password installed on the computer system.

4. The method of claim 2 further comprising:
   providing a nonvolatile storage device for the computer system, wherein the nonvolatile storage device includes a nonvolatile storage device password; and
   initializing the nonvolatile storage device password.

5. The method of claim 2 wherein the configuring includes modifying a nonvolatile memory installed in the computer system.

6. The method of claim 2 further comprising:
   retaining a copy of the nonvolatile storage device password at a location removed from the computer system.

7. The method of claim 2 further comprising:
   configuring an access token for the computer system, the access token including the security policies and the passwords associated with the computer system.

8. A method of using an access token comprising a computer system access code and a nonvolatile storage device password integrated within a set of security policies such that alteration of the security policies renders the access code and password inoperative, the security policies comprising at least one security policy selected from the group consisting of policies relating to BIOS settings and policies relating to screen interface access, said method comprising:
   transferring the computer system access code from the access token to a computer system;
   receiving a user input password at the computer system; and
   matching a computer system password with the user input password with the computer system access code from the access token to access the computer system, wherein the computer system access code includes one or more security policies configured in the computer system.

9. The method of claim 8 wherein the transferring step is performed in response to an access code received by the access token.

10. A communication device having an access token for use with a computer system, said communication device comprising:
- one or more security policies adapted to be used by the computer system, wherein the one or more security policies are stored in an encrypted format; the one or more security policies comprising at least one security policy selected from the group consisting of policies relating to BIOS settings and policies relating to screen interface access
- a security code stored on the access token, wherein the communication device transmits the one or more security policies in response to receiving an authentication code corresponding to the security code; and
- the security code integrated within the one or more security policies such that alteration of the security policies renders the security code inoperative.

11. A computer operable medium for protecting a computer system, said computer operable medium comprising:
- means for reading an access token containing a computer system access code and a nonvolatile storage device password integrated within a set of security policies such that alteration of the security policies renders the access code and password inoperative the security policies comprising at least one security policy selected from the group consisting of policies relating to BIOS settings and policies relating to screen interface access;
- means for receiving an authentication password from a user;
- means for verifying the validity of the access token based on a comparison of the authentication password to the security policy;
- means for setting security policies in the computer system; and
- means for unlocking a nonvolatile storage device on the computer system using the nonvolatile storage device password.

12. An information handling system comprising:
- means for reading an access token containing a computer system access code and a nonvolatile storage device password integrated within a set of security policies such that alteration of the security policies renders the access code and password inoperative, the security policies comprising at least one security policy selected from the group consisting of policies relating to BIOS settings and policies relating to screen interface access;
- means for receiving an authentication password from a user;
- means for verifying the validity of the access token based on a comparison of the authentication password to the security policy;
- means for setting security policies in the information handling system; and
- means for unlocking a nonvolatile storage device on the information handling system using the nonvolatile storage device password.

13. A computer system comprising:
- a processor;
- an access token communicator capable of being coupled to the processor, the access token communicator being adapted to read an access token comprising a computer system access code and a nonvolatile storage device password integrated within a set of security policies such that alteration of the security policies renders the access code and password inoperative, the security policies comprising at least one security policy selected from the group consisting of policies relating to BIOS settings and policies relating to screen interface access;
- an input device capable of being coupled to the processor, the input device adapted to receive a security code, the security code confirming authorized use of the access token;
- a software system executable on the processor and including a system security process for controlling operational access to the processor, the software system including:
- an executable program code that accesses the access token and the security code;
- an executable program code that verifies validity of the access token by comparing the security code to a verification data on the access token, whereby if the security code matches the verification data the access token is valid;
- an executable program code that receives the set of security policies from the access token in the processor if the access token is valid; and
- an executable program code that controls access to resources in the processor based on the security policies.

14. The computer system of claim 13 further comprising:
- a nonvolatile storage device operably coupled to the processor;
- a nonvolatile storage device access password that selectively allows access to the nonvolatile storage device, wherein the nonvolatile storage device password is supplied in response to the executable program code verifying that the security code matches the verification data on the access token.

15. The computer system of claim 14, wherein at least one of the set of security policies is stored within the nonvolatile storage device password.

16. The computer system of claim 13 wherein one of the set of security policies corresponds to the verification data.

17. A computer system comprising:
- a processor;
- an access token communicator capable of being coupled to the processor, the access token communicator being adapted to read an access token comprising a computer system access code and a nonvolatile storage device password integrated within a set of security policies such that alteration of the security policies renders the access code and password inoperative, the security policies comprising at least one security policy selected from the group consisting of policies relating to BIOS settings and policies relating to screen interface access;
- an input device capable of being coupled to the processor, the input device being adapted to receive verification data, the verification data confirming authorized use of the access token;
- a software system executable on the processor and including a system security process controlling operational access to the processor, the software system including:
- an executable program code that accesses the access token and the verification data;
- an executable program code that verifies validity of the access token using the verification data;
- an executable program code that sets security policies in the processor, wherein one of the one or more policies includes a BIOS control information that is used to configure the computer system; and
- an executable program code that controls access to resources in the processor based on the security policies.

18. The computer system of claim 17 wherein the BIOS control information further includes password change information, the password change information including one or more password change settings for a user using the one or more security policies.

19. A computer system comprising:
a processor;
an access token communicator capable of being coupled to the processor, the access token communicator being adapted to read an access token comprising a computer system access code and a nonvolatile storage device password integrated within a set of security policies such that alteration of the security policies renders the access code and password inoperative, the security policies comprising at least one security policy selected from the group consisting of policies relating to BIOS settings and policies relating to screen interface access;
an input device capable of being coupled to the processor, the input device being adapted to receive verification data, the verification data confirming authorized use of the access token;
a software system executable on the processor and including a system security process controlling operational access to the processor, the software system including:
an executable program code that accesses the access token and the verification data;
an executable program code that verifies validity of the access token using the verification data;
an executable program code that sets security policies in the processor;
an executable program code that controls access to resources in the processor based on the security policies; and
a display device, wherein one of the one or more security policies includes one or more interface settings that control a desktop presentation on the display device.

20. The computer system of claim 14 wherein one or more bytes of the nonvolatile storage device access password are in a non-keyboard enterable format.

21. The computer system of claim 13 wherein the access token includes one or more bytes of data in a non-keyboard enterable format.

22. The computer system of claim 13 wherein the verification data includes biometric data supplied by a user.

23. The computer system of claim 13 wherein the input device includes a keyboard and the verification data includes a personal identification number.

24. A computer system comprising:
one or more processors;
memory electrically interconnected to the one or more processors;
an operating system for controlling the operation of the one or more processors;
an access token communication device electrically interconnected to at least one of the one or more processors, the access token communication device being operable to read an access token comprising a computer system access code and a nonvolatile storage device password integrated within a set of security policies such that alteration of the security policies renders the access code and password inoperative, the security policies comprising at least one security policy selected from the group consisting of policies relating to BIOS settings and policies relating to screen interface access;
an input device electrically interconnected to at least one of the one or more processors, the input device operable to transmit a security code from a user to the one or more processors;
a nonvolatile storage device electrically interconnected to at least one of the one or more processors, the nonvolatile storage device including a nonvolatile memory;
a set of security policies associated with the operating system, the operating system operable to receive the security code for selectively enabling the set of security policies to limit access to the computer system; and
the operating system permitting access to the nonvolatile storage device and the one or more processors if the security code and the set of security policies match an authorization data stored in the nonvolatile memory,
wherein the access token further includes verification data, the verification data operable to provide the security policies to the nonvolatile memory if the security code matches an authentication code stored in the access token.

25. The computer system of claim 24 wherein the operating system includes a BIOS and the BIOS is stored in the nonvolatile memory that is electrically interconnected to the one or more processors.

26. The computer system of claim 24 wherein the access token communication device includes a smart card communication device.

27. The computer system of claim 24 wherein the access token communication device includes network circuitry that is adapted to receive signals from one or more computers interconnected on a computer network.

28. The computer system of claim 24 wherein the access token communication device includes a modem that receives signals from a communications line.

29. The computer system of claim 24 wherein the input device is a keyboard.

30. The computer system of claim 24 wherein the input device includes a biometric data reading device.

31. The computer system of claim 24 wherein the biometric data reading device includes a fingerprint scanner.

32. The computer system of claim 24 wherein the biometric data reading device includes a retinal scanning device.

33. The computer system of claim 24 wherein the nonvolatile storage device includes a hard disk drive.

34. The computer system of claim 24 further comprising a data access code stored in the nonvolatile memory, wherein a data request code corresponding to the data access code alters a state of the nonvolatile storage device.

35. A method for accessing a computer system, said method comprising:
providing a computer system, the computer system including:
one or more processors;
a memory operably coupled to the one or more processors;
an operating system for controlling the operation of the one or more processors;
an access token reading device that is adapted to read a computer system access code and a nonvolatile storage device password integrated within a set of security policies such that alteration of the security policies renders the access code and password inoperative, stored on an access token, the security policies comprising at least one security policy selected from the group consisting of policies relating to BIOS settings and policies relating to screen interface access;

an input device adapted to transmit verification data to the operating system, the verification data confirming authorized use of the access token;

a nonvolatile storage device operably coupled to the memory;

the nonvolatile storage device access password selectively allows access to the nonvolatile storage device, wherein the nonvolatile storage device password is supplied in response to the access token reading device reading the access token and the input device receiving verification data;

storing computer system access code on the access token; and comparing the verification data to the computer system access code and the nonvolatile storage device password for access to the computer system.

36. The method of claim 35 further comprising:

storing a password corresponding to the nonvolatile storage device password on the nonvolatile storage device.

* * * * *